INVENTOR
WILLIAM B. INNES

ATTORNEYS

INVENTOR
WILLIAM B. INNES

ATTORNEYS

United States Patent Office 3,537,823
Patented Nov. 3, 1970

3,537,823
GAS TESTING PROCESS FOR SMOG FORMING CONSTITUENTS
William B. Innes, 724 Kilbourne Drive, Upland, Calif. 91786
Continuation-in-part of application Ser. No. 538,503, Feb. 23, 1966. This application June 3, 1968, Ser. No. 748,109
Int. Cl. G01n 33/22, 31/00
U.S. Cl. 23—232
10 Claims

ABSTRACT OF THE DISCLOSURE

A process and device for sensing the quantity of smog forming hydrocarbons in a gas sample. The gas sample is passed through a reactive bed comprising supported and non-supported vanadia or chromia to induce exothermic oxidation of seletced hydrocarbons. A temperature probe in the catalyst bed senses the temperature rise due to oxidation. The quantity of smog forming constituents can be determined directly from the temperature increase since it has been found under proper conditions that the chromia and vanadia induced oxidation produces a temperature rise which is linear with the amount of "smog producing" hydrocarbons and insensitive to other combustibles.

RELATED APPLICATIONS

This is a continuation-in-part of patent application Ser. No. 538,503, filed Feb. 23, 1966 entitled Gas Tester for Smog Constituents, now abandoned.

BACKGROUND OF THE INVENTION

Eye irritation, health hazards, damage to vegetation and reduced visibility in the air of our large cities result from certain hydrocarbons introduced into the atmosphere. These hydrocarbons undergo oxidation in the presence of sunlight producing eye iritating aldehydes (for example, formaldehyde and acrolein) and other objectionable products that seriously reduce visibility. Other adverse effects caused by these hydrocarbons are associated with the formation of ozone and nitrogen dioxide. This condition of air pollution is known as "photochemical smog" and is defined more fully in an article by W. L. Faith entitled "Nature of Smog" in Chemical Engineering Progress 53, 406 (1957).

Although it was established by Faith, supra, that only about 30% of the hydrocarbons in automobile exhaust are responsible for about 90% of the smog manifestations so far as known, no suitable instrument is available for routine use in checking automobile exhaust gases for smog producing constituents.

The exhaust emissions from the internal combustion engines of automobiles, trucks and buses are known to supply a high quantity of the detrimental hydocarbons. Therefore, a suitable testing device for measuring the hydrocarbon level in such emissions is a must. Such a testing device also could be an essential aid in developing improved combustion processes and the effective controls necessary to avoid smog conditions.

Methods for measuring hydrocarbons present in exhaust gases have been developed. For example, hydrocarbon content determinations can be made by flame ionization or hexane-sensitized non-dispersive infrared methods. Hexane-sensitized non-dispersive infrared methods emphasize paraffins which have little or no smog producing potential. Flame ionization hydrocarbon analyzers are very sensitive to hydrocarbons but they respond to total hydrocarbons rather than those ingredients truly responsible for smog conditions. The latter analyzers also have the disadvantage of requiring a constant flow source of hydrogen and flame maintenance. This is unsuitable for use in automobile service stations and the like.

Thermal conductivity type gas analyzers are commonly used for getting a measure of air/fuel ratio, but these units give no information on hydrocarbon pollutants. They respond to hydrogen and carbon dioxide and only indirectly to carbon monoxide.

Consequently, there is a need for a testing device with a process which is fast, simple, non-hazardous and fail/safe in operation. Such a device and process should be operable by relatively unskilled technicians with no elaborate training or high degree of knowledge required. There is also a need for a process and device which are selective for the measurement of the smog forming constituents of the exhaust gases.

SUMMARY OF INVENTION

The invention is directed to a process and device for measuring the smog forming organic ingredients of a gas by contacting the gas in with a catalyst in an oxygen oxidized state containing a metallic oxide selected from the group consisting of vanadium oxide and chromium oxide having an effective active surface area to promote oxidation of the smog forming ingredients and measuring the temperature rise due to the oxidation of the organic smog forming ingredients.

It has been found that catalyst beds containing non-supported or supported vanadium oxide and chromium oxide have the ability to effect selective oxidation with corresponding exothermic heat effects which correlate with the photochemical smog potential when a sample of test gas is passed over such a catalyst under controlled conditions with the catalyst in an air oxidized state. Vanadium oxide and chromium oxide catalysts are used in this invention to detect and aid in registration, to a dependable degree, of the photochemical smog potential of test bodies of gases which include exhausts from engines, chimneys, etc.

The invention takes advantage of the heat produced when organic smog forming components and their precursors are selectively oxidized to measure their concentration.

The gas to be tested is preferably preheated to the temperature of the catalyst bed. It may be passed through a chromatographic column prior to entering the preheated and catalyst bed so that the temperature rise due to the various hydrocarbons can be observed indivdually.

The reliability of the results obtained with the process using the device of this invention has been found to depend essentially on the following briefly summarized broad ranges of measurable parameters rather than apparatus details:

(1) Nature of active "catalyst" agent; acceptable catalysts are vanadia ($V_2O_5$) and chromia ($Cr_2O_3$).
(2) Total surface area of catalyst; this should be greater than 5 m.²/g.
(3) Weight percent of active catalyst agent; for both chromia and vanadia the active catalyst should be at least 5% of the total by weight.
(4) Position of temperature probe; this can be expressed as volume of catalyst ahead of probe in the path of gas flow. From 0.02 to 2.5 cc. of catalyst has been found to be acceptable.
(5) Flow rate through the catalyst bed; this usually should be from 0.1 to 4 s.c.f.h.
(6) Temperature of bed with air flow only; this should be from 200–500° C.
(7) Catalyst bed diameter; this should be from 1/16" to 2".

The preferred catalyst is vanadia supported on alumina since some poisoning or coking of the available chromia sites has been observed.

It has been found that the temperature rise attributable to the vanadium oxide and chromium oxide catalyzed oxidation of the smog forming hydrocarbons is linear with the hydrocarbon concentration (number of mols of individual hydrocarbon) for temperature increases up to 30° C. and for catalyst bed temperatures of from 200 to 500° C. Outside of these ranges either the linear relationship between smog forming hydrocarbon concentration and the temperature rise does not hold or oxidation does not always occur. With sensitive equipment, temperature increases of 0.005° C. can be accurately measured for correlation with the hydrocarbon content. For such correlation to hold at very low levels, such refinements as maintaining moisture control of air stream and sample equivalent to eliminate adsorption heat, use of hydrocarbon free air, etc. are required.

Best results have been obtained with the process and device of this invention when the temperature increases are limited to from 0.005 to 10° C. by dilution of the sample and the catalyst bed is maintained at a temperature of from 230 to 500° C. At lower temperatures the activity does not always reliably promote complete oxidation of the smog forming hydrocarbons. At higher temperatures the hydrocarbon to carbon monoxide selectivity decreases and practical problems of operation at higher temperatures hinder the process.

If a supported vanadium oxide catalyst is used, the vanadium content expressed as $V_2O_5$ should be at least 5% and more preferably from 10 to 35% by weight. For supported chromia catalysts the chromia content should be at least 5% by weight. The preferred catalyst support is alumina but supports such as silica, carbon and chromia are also operable.

The total surface area available for catalysts should be at least 5 m.²/g. since if the available surface area is less, the oxidation is incomplete and thus the measured temperature increase is too small for accurate measurement of the total smog producing hydrocarbon content. The preferred surface area is 50 to 400 m.²/g. or higher. Optimum results have been observed when the surface is greater than 50 m.²/g.

The flow rate through the catalyst bed is desirably within the range of 0.1 to 4 s.c.f.h. since if the flow rate is too small the temperature rise is affected by heat transfer to the reactor wall and by excessive oxidation before reaching the probe. Practical problems of pressure drop through the reactor prevent the use of higher flow rates.

The temperature probe should be downstream from a catalyst volume of 0.02 to 0.30 cc. for maximum efficiency in determining the temperature rise attributable to the hydrocarbon oxidation when the stated flow rates are used, since with less catalyst preceding the probe, end effects make reproducibility difficult and with more the peak response may not occur within the probe sensitive volume.

The catalyst bed diameter should be less than 2 inches for reasonable response time but could be even larger if this was not a consideration. A lower limit of 1/16 inch is dictated by practical design limitations of the equipment for conventional probes. For best results the diameter should be between 1/16 and 1/4".

The catalyst grain size, although not found to be critical, should be small enough to adequately contact the surface of the thermopile, thermocouple or other temperature sensing means. The grain size should not be smaller than 200 mesh, however, since the pressure drop then becomes too great. In general, the grain size may be 10–200 mesh.

The optimum conditions for linear response of the temperature rise to the quantity of smog forming hydrocarbons when a vanadium oxide catalyst is used comprise a high catalytically active surface area of over 50 m.²/g., a high vanadia content of at least 10% by weight (expressed as $V_2O_5$) on an alumina support, a flow rate through the catalyst bed which exceeds 0.3 s.c.f.h. but is less than 3 s.c.f.h., and a catalyst bed temperature of from 250 to 300° C. The catalyst volume ahead of the probe should be within the broad range of 0.02 to 0.30 cc.

The optimum conditions for correlating the results of the process and device of this invention with the hexane-sensitized non-dispersive infrared procedure comprise the use of an alumina support and over 10% $V_2O_5$ with an available area of over 50 m.²/g. with a bed temperature of from 300–450° C. and a flow rate of 0.1 to 2.0 s.c.f.h. The volume of catalyst ahead of the probe should preferably be from 0.1 to 0.3 cc.

One feature of this invention is that it provides suitable instrumentation methods and means for selectively measuring the harmful hydrocarbon components in fluids emitting from fuel burning sources.

Another feature of this invention is that it provides a method for obtaining data for the measurement of automotive air pollution constituents which contribute to photochemical smog while also providing data useful for engine maintenance purposes and for improvement in the ignition characteristics as well as to indicate faulty valve operation in fuel burning devices.

Still another feature is that data may be collected for a variety of operating conditions and with the concurrent use of intake manifold-vacuum readings along with voltage patterns and carbon monoxide analysis it is possible to more precisely pinpoint engine problems and make it feasible to reduce smog forming emissions by proper maintenance.

Another feature is that the response of the process can be varied by simple changes in operating conditions so that it correlates well with hexane-sensitized non-dispersive infrared method currently used for control purposes.

Another feature is that the response is directly proportional to the concentration of smog producing hydrocarbon injected into the inlet stream over normal ranges in exhaust gases.

Yet another feature of the process of this invention is that interference from non-hydrocarbon constituents is negligible.

Other features will become apparent from a consideration of the specification in conjunction with the appended claims and the accompanying drawings.

Figures 1, 2, 3, 4, 5:
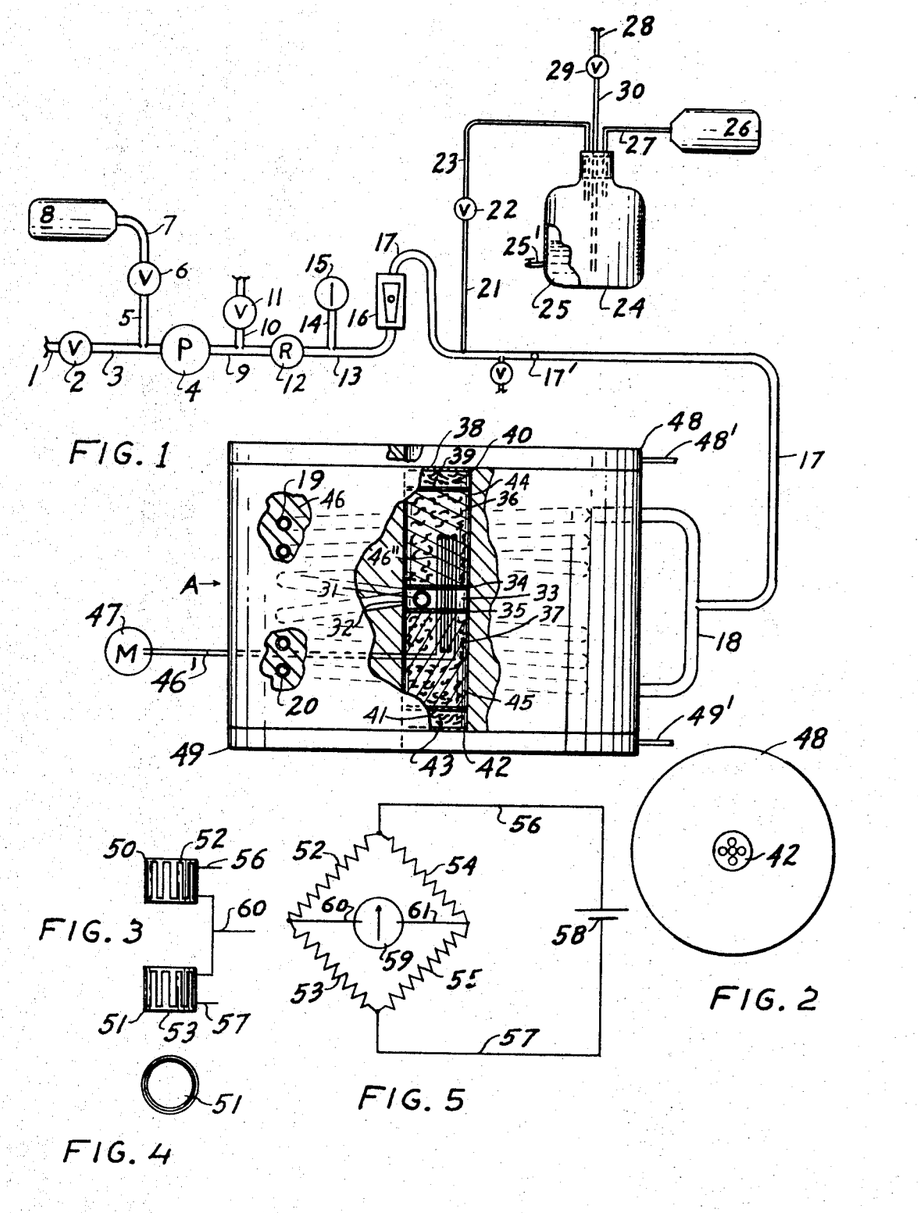
FIG. 1 is general schematic showing of a testing device or system to determine the degree of smog constituents in gases.
FIG. 2 is a bottom (or top plan view) of the analyzer unit shown in FIG. 1, but shown on a smaller scale.
FIG. 3 is an elevational view of a subcombination form of the invention for substitution of a part in the analyzer of FIG. 1.
FIG. 4 is a top (or bottom plan) view of that shown in FIG. 3.
FIG. 5 is a schematic view of an electrical circuit to be used in combination with that shown in FIG. 3.

In one embodiment of the invention, as shown in FIGS. 1 and 2, an achievement of the desired results is obtained through the use of a differential electrical current producing thermopile which measures the differential temperature rise and produces a direct readout on a suitable meter. It is done through the use of a simple meter without an electronic amplifier or power source apart from that required for the heating elements.

The form of the invention shown in the mentioned drawing figures tests gases such as the exhaust from engines etc. The gas to be tested is conducted through a conduit 3 by action of a fluid pump 4. This pump is capable of operating at various set pressures which force the gas to be tested into a conduit 9. Atmospheric air enters the conduit system through pipe 1 when the valve 2 is open. A tap is made from the conduit 3 by a pipe 5 having a valve means 6 connected to an ingress pipe 7. A detachable and flexible gas proof bag 8 is connected to the pipe 7. This bag is charged with the gas to be tested which, for example, may be the exhaust gas from an automobile engine. A bleeder pipe 10 with a valve 11 is connected to the conduit 9. The gas passes through a pressure controller 12 into a conduit 13 which has an off-shoot pipe 14 that leads to a pressure gauge 15.

A rotameter 16 is connected between the conduit 13 and the conduit 17. The rotameter 16 indicates the volume or flow rate of gas passing through the conduit 17 and hence into the analyzer unit A. A pipe 21 is connected to the conduit 17 and has a manually operable hand valve 22 mounted therein. The hand valve 22 connects the pipe 21 with a pipe 23 that is in fluid communication with the sample container 24. The sample container is graduated and contains a suitable liquid 25. A valved drain means 25' is connected to the container. This container has an ingress pipe 27 attached to a flexible bag 26 which is gas tight and contains a sample of exhaust gas for test purposes.

A pipe 28 is connected to a suitable water supply which passes through valve 29 and hence through pipe 30 into the container. A suitable stopper closes the neck of the container 24 and accommodates the pipes or tubes 23, 27 and 30.

The analyzer A is shown in detail in FIG. 1 and has an aluminum tubular-like block or casting 46 provided with a pair of stainless steel coils 19 and 20; the inner ends of these coils open into the chamber 33 at 31 and 32. The outer coil ends are connected to the manifold pipe means 18 and hence to the pipe 17. The central bore 36 of the casting is provided with the top cap-like means having the perforated walls 38 and 39 containing between them a filter of Pyrex wool 40. A pair of spaced walls 41 and 42 are also provided and they are perforated to provide a bottom Pyrex wool outlet means 43. Any suitable inert material 44 in granular form is mounted in one end portion of the bore 36 and a suitable catalyst 45 in granular form is mounted in the opposite end of the bore. A differential thermopile 46'' with a plurality of junctions has some disposed in the inert material 44 and the remainder disposed in the catalyst 45 to generate an electric current that passes from the thermopile via iron wires 46' to a suitable galvanometer or meter 47. The aluminum casting 46 is heated by electrical annular resistance heating elements 48 and 49. The heating element 48 has electrical feed lines 48' and the heater 49 has the feed lines 49'. The feed lines lead to a suitable source of electrical energy through convenient switch means. The heating elements 48 and 49 are thermostatically controlled to regulate the block temperature.

Figures 1A, 7:
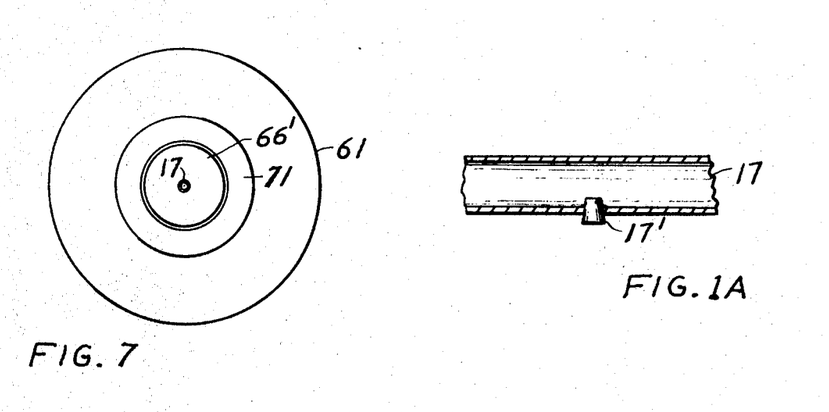
FIG. 1A is a sectional view of a pipe showing a plug therein.
FIG. 7 is an end elevational view of that shown in FIG. 6.

The number 17' in FIGS. 1 and 1a indicates a rubber plug in conduit 17 that is provided with a small bore (normally closed) adapted to receive the hollow needle of an injector so test gas can be injected at this point as shown in FIG. 1a.

A chromotography column may be in fluid communication with the conduit 17 so that the sample is required to flo wthrough the column before entering the preheating coils 19 and 20 and the reactor. In this manner the temperature response of individual hydrocarbons can be sensed as they are released from the column into the reactor. The column may contain a large pore material such as Chromosorb which can act as a water reservoir and thereby control the humidity of the gas to 100% during the time of sample passage assuming the air stream is also water saturated and acts to maintain the Chromosorb pores in a water saturated condition.

The system performs as follows:

The atmospheric air or the exhaust from an automobile engine or mixtures (the gas to be tested) enters into the conduit 17 and hence to the analyzer A. In the coils 19 and 20 of the heated aluminum block the gas is brought to a temperature substantially that of the block. In the central core or chamber 33 the gas divides, some passing through the inert material 44 and hence to the atmosphere via the end cap 40 and the other portion of the gas passing through the catalyst 45 where certain ingredients thereof are exothermically oxidized and pass through the end cap 43. The hydrocarbon pollutants of the gas are oxidized by the catalyst 45 and this exothermic reaction raises the temperature of the gas and the catalyst material 45. This rise in temperature generates an electric current in the thermopile 46'' and this temperature is measured in the meter 47 so that the meter can give a direct reading of the amount of pollutants in the test gas. The junctions in the inert material 44 balance any variation in block temperature so that the reading on meter 47 is a true indication of the exothermic temperature rise.

FIGS. 3, 4 and 5 show a substitute means for the thermopile in FIG. 1. The tube or cylinder 50 is of ceramic material or some equivalent substance and the tube 51 of the same material. Cemented to the outer surface of the tube 50 there is a coil of resistance wire 52 and cemented to the outer surface of tube 51 there is a coil of resistance wire 53. These wires may be termed grids in that they act only as resistance elements so that when heated in the analyzer by the passing gas, their resistances increase in accordance to the temperature rise.

In FIG. 5, the resistance elements are shown connected in series with an electric battery 58 via wires or conductors 56 and 57. A pair of fixed resistance elements 54 and 55 are also connected in series with the battery 58 but in parallel with respect to resistance elements 52 and 53. The voltage differences between the parallel arranged resistance elements is indicated by a meter or galvanometer 59 connected as shown by the conductors 60 and 61. Such a Wheatstone bridge will show variations in the meter reading which will be in direct proportion to the resistance increase or decrease differential of the resistance elements 52 and 53. The element 52 is placed in the end portion of bore 36 having the inert material 44 and the element 53 is placed in the portion having the catalyst material 45.

Figure 6:
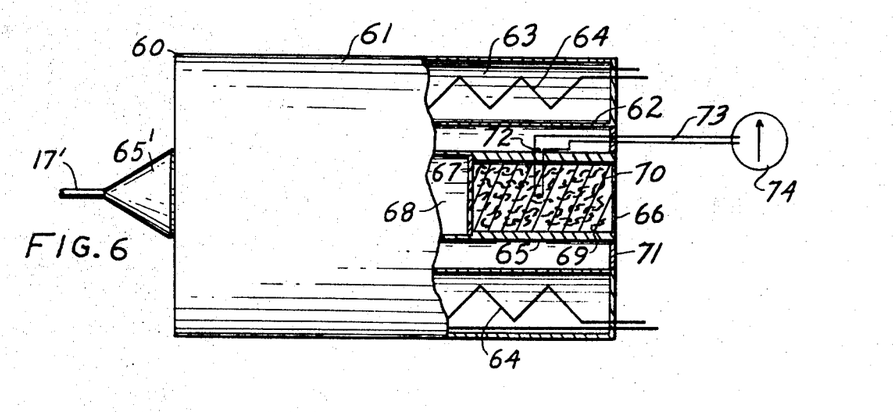
FIG. 6 is an elevational view of a modification of the invention with a portion thereof broken away.

As shown in FIGS. 6 and 7, a modified form of the invention is illustrated. A tubular heater 60 is shown having an outer surface 61 and an inner surface 62 which forms an annular chamber 63 to accommodate resistance type heater coils or elements 64 which have necessary connection to a suitable source of electrical energy and through a suitable control switch. The outer tube 61–62 accommodates a spaced inner tube having the cylindrical wall 65 which is thick at one end and may be of some suitable insulating material to reduce transfer of heat. The inner tube is supported by a plurality of spider-like discs 71 (one shown). Perforated walls 66 and 67 allow gas to pass through the inner tube and through a catalyst material 70 which is in granular form. The forward end 65' of the inner tube is conical in shape and has means for attachment to the inlet-pipe 17 of the system shown in FIG. 1.

A thermopile or differential thermopile 72 is provided through the wall of the inner tube and is connected to iron wires or conductors 73 which make connection with a suitable meter or galvanometer indicated at 74. One or more junctions are in the catalyst bed and the same number of opposing junctions are welded to the tube wall. It is important for all sensing elements that they have no catalytic action of their own that might result in temperature effects. Therefore, all elements are non-catalytic or are protected from direct contact with the gas with a coating of impervious inorganic cement or other suitable material.

EXAMPLES AND DISCUSSION

The problem of selective hydrocarbon analysis by thermal variations is complex since it can be influenced by the nature of oxidation products, kinetics of oxidation, surface uniformity, gas viscosity, carbon deposition, heat effects from adsorption-desorption phenomena, probe placement, bed diameter, thermal conductivity of gas and catalyst, etc.

Efforts to determine catalyst effectiveness showed that the most effective catalysts were the metallic oxides alumina, titania, vanadia, chromia both free and supported on various support materials.

Data on the oxides are shown in Table I. The results indicated that both chromia and vanadia had surprisingly high hydrocarbon activity and selectivity at optimum conditions, whereas the alumina and titania either had inadequate activity or low HC/CO selectivity.

TABLE I.—ACTIVITY AND SELECTIVITY OF CATALYSTS FROM VARIOUS OXIDES

| Example No. | Preparation method | Active agent | Surface area square meters, per gram | Temp., °C. for 100 microvolts hexane response [a] | i-Butene to n-Hexane [b] selectivity | Hexane selectivity [c] to CO | Hexane selectivity [c] to $H_2$ |
|---|---|---|---|---|---|---|---|
| 1 | Calcined 80–100 mesh, $NH_4VO_3$ | 100% $V_2O_5$ | 10±5 | 369 | 2.8 | 150 | 240 |
| 2 | Kaiser alumina, Grade 101 | 100% $Al_2O_3$ | 300 | 430 | 1.5 | 38 | 160 |
| 3 | Titania pigment | 85% $TiO_2$ | 10±5 | 460 | 1.3 | 5 | 20 |
| 4 | Calcination of $NH_4CrO_4$ solution to 800° F. | 100% $Cr_2O_3$ | 10±5 | [d] 210 | [d] 1.3 | 100 | 300 |

[a] Conditions: 0.7 CFH water saturated air flow, .25" diameter catalyst bed, .20 cc. of catalyst ahead of 20 gauge Iron-Constantan thermocouple probe whose output is read with a microvolt meter. Samples injected: 5 cc. 1% hexane, 5 cc. 1% butene, 5 cc. 100% CO, 5 cc. 100% $H_2$.
[b] Relative response per carbon at a n-hexane response of 100 microvolts/cc. C where cc. C=carbon number × cc. hydrocarbon.
[c] Relative response (microvolts/cc. C) for hexane to cc. of CO or $H_2$ at a hexane response of 100 microvolts/cc. C or less.
[d] Results variable with previous history of hydrocarbon testing.

Tables II and III show data obtained by the injection of samples containing predetermined amounts of smog forming hydrocarbons into beds of various vanadia catalysts on various supports using the device of this invention. It seems evident from these data that a vanadia content in excess of 5% is needed for good HC/CO selectivity and satisfactory response at practical temperature (below about 500° C.). For example, as Example 10 of Table II shows, the HC/CO selectivity for a 5% $V_2O_5$ alumina supported catalyst was only 1:1. For best evaluation of smog forming constituents this ratio should be at least 10. The selectivity for the 8% $V_2O_5$ catalyst of Example 11 with substantially the same surface area was 36.

It is evident from Table II that the combination of high surface area (over 50 m.$^2$/g.) and high vanadia content (over 10% on an alumina base) gives optimum performance. Alumina supported catalysts give more linear response than non-supported $V_2O_5$ according to Table II as shown by Examples 7–9 as compared with Example 1.

TABLE II.—ACTIVITY AND SELECTIVITY OF VARIOUS VANADIUM OXIDE CATALYST PREPARATIONS

| Example No. | Nature of catalyst | Calculated, percent $V_2O_5$ | Surface area, m.$^2$/g. | °C. temp. for 100 microvolts peak hexane response [1] | Butene to hexane selectivity [2] | Hexane to selectivity CO | Hexane to selectivity $H_2$ | n-Hexane linearity [3] percent |
|---|---|---|---|---|---|---|---|---|
| 1 | 80–100 mesh $NH_4VO_3$ calcined to 1,000° F. in 1 hr.[f] | 100 | 10±5 | 369 | 3.0 | 200 | 420 | 77 |
| 5 | Johns Manville diatomaceous silica (Chromasorb P) impregnated with $NH_4VO_3$ solution | 15 | 10±5 | 535 | 2.7 | 72 | 100 | |
| 6 | Davison Grade 522 20–40 mesh silica-alumina adsorbent impregnated with $NH_4VO_3$ solution.[a] | 10 | 800 | 500 | 2.5 | 31 | 55 | |
| 7 | 20–40 mesh Kaiser alumina grade 101 impregnated with $NH_4VO_3$ solution [b] | 15 | 280 | 369 | 2.9 | 300 | 500 | 98 |
| 8 | 20–40 mesh Kaiser alumina grade 101 impregnated with $NH_4VO_3$ solution [c] | 24 | 200 | 293 | 2.9 | 400 | 800 | 98 |
| 9 | 20–40 mesh Kaiser alumina grade 101 impregnated with $NH_4VO_3$ solution [d] | 24 | 45 | 346 | 3.0 | 100 | | 98 |
| 10 | 20–40 mesh Kaiser alumina grade 101 impregnated with $NH_4VO_3$ solution [e] | 5 | 275 | 500 | 4 | 1 | 2 | |
| 11 | 20–40 mesh Kaiser alumina grade 101 impregnated with $NH_4VO_3$ solution [g] | 8 | 265 | 410 | 3 | 36 | | |
| 12 | 20–40 mesh Kaiser alumina grade 101 | 0 | 300 | >600 | | | | |
| 13 | Blank (Pyrex wool in cell) | 0 | 0 | >600 | 2 | 2 | 2 | |

[1] See footnote a Table I.
[2] Defined as carbon basis ratio of i-butene to n-hexane peak responses at conditions giving 100 microvolt response per cc. C (6 x cc. hexane).
[3] Defined as hexane response per carbon for .05 cc. hexane relative to .016 cc. hexane.
[a] Impregnated by slow addition of 90° C. saturated ammonium metavanadate water solution to base material to pore saturation endpoint. Pore saturated material calcined to about 1,000° F. in one hour. Operation repeated three times.
[b] Same as c except only one additional impregnation used.
[c] Prepared by first impregnating Kaiser Grade 101 Alumina with $NH_4VO_3$ solution at 15 p.s.i. (125° C.) then calcination to 1,000° F. followed by three additional impregnations with saturated $NH_4VO_3$ solutions at 90° C. to a pore saturation endpoint with calcination to 1,000° F. for 1 hour after each impregnation step.
[d] Same as c except final calcination to 1,250° F.
[e] Prepared by mixing a saturated solution of $NH_4VO_3$ at 100° C. with Kaiser Grade 101 Alumina, evaporating to dryness and calcining to 1000° F. in one hour.
[f] Ammonium meta vanadate heated in muffle furnace to 1,000° F.
[g] Sample 10 given an extra impregnation with hot (90° C.) saturated ammonium metavanadate water solution.

TABLE III.—EFFECT OF COMPOSITION ON ACTIVITY OFR OXIDATION OF CARBON MONOXIDE AND BUTYLENE

| Substance Added | | Comparative responses | | |
|---|---|---|---|---|
| | | Response from 50 cc. injection | | |
| Compound | Mol percent | Example 13, alumina Kaiser 101 | Example 14, vanadia-[alumina[1] 5% $V_2O_5$ | Example 15, vanadia-alumina[1] 15% $V_2O_5$ |
| | | Peak height in microvolts | | |
| Carbon monoxide | [2]6.7 | [3]100 | [3]25 | [3]5 |
| Isobutylene | 1.0 | [4]50 | [4]100 | [4]200 |

[1] Kaiser grade 101 alumina (calcined 1,100° F.) used as a catalyst support. Surface areas all close to 250 sq. meters per gram. Catalysts prepared by impregnation of base with saturated ammonium metavanadate solution and evaporation to dryness at the necessary temperature to achieve indicated $V_2O_5$ levels (5% $V_2O_5$ at 90° C., 15% $V_2O_5$ at 125° C.,) followed by calcination to ),100° F.
[2] Balance: 15.1% $CO_2$, 74% $N_2$.
[3] Flow rate 1.6 liters/minute ambient air (response decreases with increase in flow rate).
[4] Response from single differential iron-constantan thermocouple using the tube furnace screening unit. Initial catalyst bed temperature 380° C., flow rate: 5.3 liters/minute, bed diam. 1/4", catalyst ahead of probe .20 cc.

Table IV involves continuous addition to steady state response with a catalyst bed of 15% vanadia on an alumina support. The data indicate appreciable response from auto exhaust without significant response from carbon monoxide under indicated conditions. Good linearity is shown between hydrocarbon concentartion and response by the almost constant response per percent hydrocarbons in the stream.

Table V involves resistance element temperature measurement (see FIG. 5) at other conditions and illustrates selectivity or correlation of response with smog effects under both slug injection and steady state sample addition for the alumina supported 15% vanadia catalyst.

TABLE V.—TESTS USING RESISTANCE WIRE PROBES FOR TEMPERATURE MEASUREMENT[1]

| Nature | Component added | | | Response | | | | Rel. smog effects, see Table VI for definition |
|---|---|---|---|---|---|---|---|---|
| | Conc. as percent HC | Fraction of stream, percent | HC in stream, percent | Initial bed temp., °C. | Peak height, millivolts[a] | Steady state, millivolts[a] | Response per percent HC in mix, millivolts | |
| | [Sample addition by 50 cc. injection (5 sec.)[b]] | | | | | | | |
| Gasoline vapor | 100 | 7.7 | 7.7 | 300 | 5.4 | | .65 | 15 |
| Xylene | 10.5 | 7.7 | 0.80 | 300 | 1.0 | | 1.14 | 26 |
| | [Prolonged sample addition to "Steady state response"] | | | | | | | |
| Idle exhaust | 0.7 | 5.1 | .035 | 350 | | 1 | 27 | 50 |
| Do | 0.7 | 10.0 | .01 | 350 | | 3 | 43 | 50 |
| Cruise exhaust | 0.2 | 10.0 | .02 | 350 | | 0.6 | 30 | 60 |
| Do | 0.2 | 11.0 | .022 | 350 | | 0.8 | 36 | 60 |
| Xylenes | 10.0 | .24 | .024 | 345 | | 2.4 | 10 | 26 |
| Butanes | 400 | .80 | .32 | 345 | | 0.6 | 1.9 | 0 |
| Air | 0 | 10.0 | 0 | 350 | | 0.0 | | |

[1] Percent HC=Mol percent hydrocarbon expressed as carbon atoms. Example 15 catalyst described in Table III.
[a] Millivolts (no load)=15.6 times indicated reading because of low resistance of meter and nature of bridge circuit.
[b] To air stream at about 7.5 liters ambient air/minute flow.

TABLE IV.—TESTS USING THERMOPILE TEMPERATURE MEASUREMENT BY PROLONGED SAMPLE ADDITION TO STEADY STATE RESPONSE[1]

| Nature | Component added | | | Steady state response, millivolts | Response per percent HC in stream, millivolts |
|---|---|---|---|---|---|
| | Conc. mol percent | Fraction of total stream, percent | Conc. in total stream, mol percent | | |
| Idle exhaust | [2]0.7 | 50.0 | .35 | 4.20 | 12 |
| Do | [2]0.7 | 5.6 | .039 | 0.40 | 10 |
| Do | [2]0.7 | 14.4 | .099 | 1.20 | 12 |
| Cruise exhaust | [2]0.19 | 4.5 | .008 | 0.075 | 9 |
| Do | [2]0.19 | 24.0 | .046 | 0.60 | 13 |
| Carbon monoxide | 4.5 | 20.0 | .90 | 0.07 | |

[1] Bed temperature=340+10° C., flow rate=4.2 liters ambient air per minute. One to two minutes for 90% of steady state response. Catalyst Example No. 15 as described in Table III.
[2] Expressed as mol percent hydrocarbon in form of hydrocarbon as measured with a flame ionization total hydrocarbon analyzer.

Table VI shows results obtained with the thermopile reactor shown in FIG. 3. The results show good correlation of peak response from slug injection with photochemical smog potential under the indicated conditions and insignificant interference from hydrogen.

TABLE VI.—RESPONSE TESTS USING THERMOPILE TEMPERATURE MEASUREMENT Vs. SMOG POTENTIAL (SAMPLE ADDITION BY 50 cc. INJECTION)

| Component added | | Response | | | Photo-chemical smog potential (relative smog effect [a] per percent HC) |
|---|---|---|---|---|---|
| Nature | Conc. injected, mol percent | Theoretical conc. in gas stream, mol percent | Peak height, millivolts | Millivolts per percent HC[1] in stream | |
| Hydrogen | 4 | .57 | .010 | | |
| Ethylene | [b] 20 | [b] 2.86 | .035 | .012 | 61 |
| iso-Butylene | [b] 4 | [b] 0.57 | .50 | .88 | 105 |
| Mixed butanes | [b] 40 | [b] 5.7 | .37 | .06 | 0 |
| n-Hexane | [b] 140 | [b] 20 | 1.00 | .05 | 6 |
| Benzene | [b] 87 | [b] 12.5 | 1.00 | .08 | 6 |
| Xylenes | [b] 10 | [b] 1.43 | 0.80 | .55 | 26 |
| Gasoline vapor | [b] 100 | [b] 13.3 | 3.00 | .20 | 15 |

[1] Steady for 5 sec. Bed temperature=340±10° C., flow rate=4.2 liters ambient air/minute, bed diameter=5/8″, 2.5 cc. of catalyst ahead of probe. Example 15 catalyst described in Table III.

[a] Based on evaluation of M.P. Sweeney (Paper presented at Chicago A. I. Ch. E. meeting, Dec. 4, 1962 titled "Standardized Testing of Smog Control Devices for Vehicular Exhaust").

[b] Expressed as mol percent carbon in form of hydrocarbon.

The effect of temperature on peak response for high $V_2O_5$ content $V_2O_5$-$Al_2O_3$ catalyst is shown in Table VII and Table VIII. Both tables show that selectivity decreases with temperature.

TABLE VII.—EFFECT OF TEMPERATURE ON RESPONSE TO DIFFERENT TYPE COMPOUNDS

| | Sample injected (50 cc.) [a] | | |
|---|---|---|---|
| | 1% i-$C_4H_8$ | 1% n-$C_4H_{10}$ | 6.7% CO mix [b] |
| | Peak height in microvolts | | |
| Initial bed temperature, ° C.: | | | |
| 300 | 220 | 10 | 0 |
| 350 | 260 | 35 | 3 |
| 400 | 280 | 60 | 7 |
| 450 | 310 | 100 | 10 |
| Relative smog potential | 105 | 0 | 0 |

[a] Into 4 liter/minute of ambient air in 5 sec. Response from single differential iron-Constantan thermocouple in the tube furnace (screening) unit (Fig. 6), .20 cc. of catalyst ahead of probe. Example 15 catalyst described in Table III.

[b] Balance: 15.1% $CO_2$, 5.2% $O_2$, 74% $N_2$.

TABLE VIII.—EFFECT OF TEMPERATURE ON VANADIA-ALUMINA CATALYST RESPONSE

| | Response, ° C. temp. rise/cc. C | | |
|---|---|---|---|
| | n-Butane | n-Hexane | Butene-1 |
| Block temperature: | | | |
| 300 | 0.4 | 2.0 | 9.0 |
| 350 | 1.0 | 4.0 | 13.0 |
| 400 | 5.0 | 9.5 | 9.0 |

NOTE.—.20 cc. catalyst volume ahead of probe, 0.8 s.c.f.h. air flow, 0.25 catalyst bed diameter, Example 7 vanadia-alumina catalyst.

The effect of decreasing flow rate in the range 0.4–1.4 s.c.f.h. was found to be substantially equivalent to increasing temperature in the range 300–400° C. in that it was found that a 4% decrease in flow was equivalent to a 1° C. temperature increase. Limitations on flow rate are imposed on the low side because this, as well as volume of the system between the injector port and reactor probe, affects response time since the gas must reach the probe point before reaction and temperature rise. Also, in sample slug injection, if the slug takes too long to pass, temperature rise will be decreased because of heat transfer to the wall. Too high flow rates result in pressure drops that make the operation impractical for most low cost pumps. These factors generally dictate a limit of 0.1 to 4 s.c.f.h. through the reactor.

The change in selectivity with flow and temperature makes it possible to readily adapt the process and device to changing selectivity requirements and conditions. That is, the system can be converted from less selective application (e.g. correlation with the hexane-sensitized infrared) to applications where it is desirable that hydrocarbon response be related to smog effects. A practical temperature limit on the low side because of activity considerations is about 230° C. while the upper limit is about 500° C. because of HC/CO selectivity considerations as well as the limits of construction materials.

Another important parameter that can affect selectivity is probe position which can be expressed as volume of catalyst ahead of the probe in the case of an axially placed thermocouple or thermistor. At a position near the inlet, selectivity is higher and less affected by flow rate and temperature.

Still another parameter, as shown by the results tabulated in Table IX and X, is bed diameter. Its primary effect assuming constant catalyst volume ahead of the probe is on heat transfer from bed to block or air stream. Therefore, it is not surprising that recovery time and time to reach steady response in the case of continuous sample additions are primarily affected by this parameter. That is, where rapid recovery or fast equilibrium response are desirable, bed diameter should be low. Table IX shows the general observed effects. Table X gives more detailed information for an extreme case. The data therein indicate that vanadia-alumina catalytic thermal analysis can be used even for rapid continuous analysis applications requiring response and recovery under ten seconds such as following changes in hydrocarbon level in exhaust during an engine cycle or rapid engine adjustment. Response times under ten seconds also indicate feasibility for usage as a chromatography detector. Limits on minimum diameter are determined by pressure drop and the size of available temperature probes. A diameter of 1/16″ seems to be a practical lower limit. A diameter of 3/16 inch has been found to be the preferred upper limit although diameters of at least 2 inches can be used for applications where response time is not important such as air monitoring.

TABLE IX.—EFFECT OF BDE DIAMETER ON TIME TO STEADY STATE AND RECOVERY TIME WHEN SAMPLE FLOW REPLACED WITH AIR*

| | Equilibrium time,[a] minutes | Recovery time,[b] minutes |
|---|---|---|
| Diameter if catalyst bed, inches: | | |
| .189 | 0.3 | 0.3 |
| .250 | 0.7 | 0.7 |
| .33 | 1.5 | 1.0 |
| .62 | 2.5 | 1.7 |

[a] Time to reach 90% of equilibrium level.
[b] Time to reach 90% recovery.
* Single thermocouple probe in center of tube with .1-.2 cc. of vanadia-alumina catalyst ahead of the probe, 300-375° C. temperature and 0.5 to 1.0 s.c.f.h. water staturated air flow rate.

TABLE X.—RESPONSE STUDY WITH VANADIA-ALUMINA CATALYST USING BAG SAMPLES*

| Compound | Concentration, carbon basis percent | Plateau response microvolts/ percent C[d] | Equilibrium time[a], sec. | Recovery time[b], sec |
|---|---|---|---|---|
| n-Butane | 13.3 | 3.15 | 5 | 5 |
| n-Hexane | 1.57 | 10 | 5 | 5 |
|  | 4.71 | 12 | 5 | 5 |
| Hexane | 2.21 | 87 | 4 | 6 |
| Benzene | 6.0 | 6.5 | 5 | 6 |
| iso-Octane | 1.16 | 53 | 5 | 4 |
| Butylene | 1.33 | 147 | 5 | 5 |
| Propylene | 5.00 | 14 | 5 | 5 |
| Ethylene | 13.3 | 1.8 | 5 | 5 |
| Acetylene | 6.67 | 7.3 | 5 | 5 |
| Benzaldehyde | 0.91 | 125 | 10 | 22 |
| Methanol | 0.79 | 160 |  |  |
| Idle mode auto exhaust | [c]1.0 | 103 | 5 | 12 |
| Cruise mode auto exhaust | [c]0.4 | 143 | 5 | 10 |
| Carbon monoxide | 50 | 0.1 |  |  |

*Mixtures with air in 3 liter bag fed to reactor by suction (9″ Hg) applied on exit of reactor. Flow rate 1050 cc./min, bed temperature 376–389° C., catalyst bed diameter=⅛″, catalyst volume ahead of probe=.02 cc., catalyst 40–100 mesh Example 7.

[a] Time to reach 90% of plateau value.
[b] Time to decrease to 10% of plateau value.
[c] Estimated on the basis of other reading under similar conditions with flame ionization hydrocarbon analyzer.
[d] Output of single iron-constantan thermocouple measured with microvoltmeter (18 microvolts=1° C.).

CHROMIA CATALYST DATA

Chromia catalysts were found to combine very high HC response and good HC/CO as well as HC/$H_2$ selectivity at low temperatures (200–250° C.) as shown by the data in Table XI. However, they were found to have a major deficiency in that response decreased when successive hydrocarbon samples were added both for pure and alumina supported $Cr_2O_3$ although they could be regenerated by air passage over a period of time. This might be explained on the basis of active sites being temporarily poisoned by carbon deposition or by some slowly reversible valence change. However, the problem was partially solved by bubbling the air through a low vapor pressure hydrocarbon which may serve to "permanently" deactivate the "high activity sites." Best results were obtained when a steady state of the chromia was obtained by passing admixtures of air and less than 100 p.p.m. hydrocarbon vapor over the catalyst prior to contacting it with the gas sample. Olefin to hexane selectivity was less than found for vanadia as shown in Table XI so that chromia appears inferior to vanadia for obtaining a measure of the smog potential of auto exhaust. As shown in Table XI, HC/CO and i-butene/n-hexane selectivity were improved over that for pure $Cr_2O_3$ by use of high levels of $Cr_2O_3$ on a high surface area alumina.

Due to the erratic behavior of the chromia catalyst, complete data regarding linearity of temperature response was not obtained. It was observed, however, that the response appeared to be more linear for chromia supported on a high surface area alumina as shown by Table XI.

The invention may be embodied in other specific forms without departing from the spirit or essential characteristics thereof. The present embodiments are therefore to be considered in all respect as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

What is claimed is:

1. A process for selectively determining the photochemical smog producing readily oxidizable organic ingredients in a gaseous sample including other combustibles by their heat of oxidation, the process comprising the steps of
   (a) passing an oxidation supporting gas through a granular catalyst bed at 200–500° C. at 0.1 to 4.0 s.c.f.h., the catalyst bed being selected from the group consisting of vanadia and chromia in excess of 5% by weight when expressed as $V_2O_5$ and $Cr_2O_3$ respectively, and having a surface area in excess of 5 m.$^2$/g.;
   (b) adding sample gas to the gas stream and passing the mixture through the bed at a substantially constant flow rate and at the same temperature as for step (a);
   (c) observing the temperature rise in the catalytic bed due to oxidation of said organic ingredients therein at a location downstream from initial contact of the mixed gases and the catalyst bed by a linear distance equivalent to a volume of 0.02 to 2.5 cc. of catalyst; and
   (d) calculating the content of the ingredients from the maximum temperature rise in the range of 0.005–10° C. based on the substantially linear relationship between these quantities.

2. The process of claim 1 wherein the surface area of the catalyst bed is in excess of 30 m.$^2$/g.

3. The process of claim 1 wherein the catalyst bed is supported on alumina.

4. The process of claim 1 wherein the catalyst bed is vanadium oxide.

5. The process of claim 4 wherein the vanadium oxide is supported on alumina.

6. The process of claim 4 wherein the vanadium oxide expressed as $V_2O_5$ is between 10–35% by weight.

7. The process of claim 4 wherein the catalyst bed has a surface area in excess of 50 m.$^2$/g., the vanadium oxide expressed as $V_2O_5$ is in excess of 10% by weight, the oxidation supporting gas is passed through the granular catalyst bed at 250–300° C. at between 0.3 and 3 s.c.f.h. and the temperature is observed at a location downstream from initial contact of the gases and the catalyst bed a linear distance equivalent to a volume of .02 to 0.30 cc. of catalyst.

8. The process of claim 4 wherein the catalyst bed has a surface area in excess of 50 m.$^2$/g., the vanadium oxide is supported on an alumina support and expressed as $V_2O_5$ is in excess of 10% by weight, the oxidation supporting gas is passed through the granular catalyst bed at

TABLE XI.—ACTIVITY[1] AND SELECTIVITY[1] OF VARIOUS CHROMIA CATALYSTS

| Example No. | Nature of catalyst | Calculated, percent $Cr_2O_3$ | Surface area in sq. meters, per gram | ° C. temp. for 100 microvolts peak n-hexane response | i-Butene to n-Hexane selectivity | Hexane to selectivity CO | Hexane to selectivity $H_2$ |
|---|---|---|---|---|---|---|---|
| 4 | Calcination of $NH_4CrO_4$ water sol. to 800° C | 100 | 10 | 210 | 1.3 | 100 | 300 |
| 16 | Kaiser alumina grade 101 impregnated with $NH_4CrO_4$ and calcined to 1,100° F. | 19.5 | 310 | 210 | 1.9 | 290 | 1200 |
| 16 | do | 19.5 | 310 | [a]250 | [a]1.5 | [a]290 | [a]300 |

[1] Conditions and definitions the same as for Tables I and II. Values very variable since responses decreased markedly with frequent successive (ca. ½ min.) sample injections up to about 5 injections and recovered after about 60 min., dependent somewhat on bed temperature (effect more noticeable at low bed temperature).

[a] Flowing air saturated with low vapor pressure hydrocarbon (diesel fuel).

300–450° C. at between 0.1 to 2.0 s.c.f.h. and the temperature is observed at a location downstream from initial contact of the gases and the catalyst bed a linear distance equivalent to a volume of 0.1 to 0.3 cc. of catalyst.

9. The process of claim 1 wherein the carrier gas and the sample are passed through a chromatography column to separate the organic ingredients immediately prior to contacting the carrier gas and the sample gas with the catalyst bed to sense the heat of oxidation response to individual ingredients as they pass from the chromatography column into the catalyst bed, the bed having an effective diameter not greater than 3/16 inch to obtain separation of response.

10. The process of claim 1 wherein the catalyst bed is chromia and prior to step (a) admixtures of air and less than 100 p.p.m. of a low vapor pressure hydrocarbon vapor are passed over the surfaces thereof.

References Cited

UNITED STATES PATENTS

| | | | |
|---|---|---|---|
| 1,375,933 | 4/1921 | Rideal et al. | 23—232 |
| 1,578,666 | 3/1926 | Katz | 23—232 |
| 2,531,592 | 11/1950 | Yant et al. | 23—232 |
| 2,782,103 | 2/1957 | Prentiss | 23—232 X |
| 2,901,329 | 8/1959 | Kapff | 23—232 X |
| 3,025,132 | 3/1962 | Innes | 23—288 X |
| 3,100,140 | 8/1963 | Ashley et al. | 23—288 |
| 2,912,300 | 11/1959 | Cannon et al. | 23—2 |

JOSEPH SCOVRONEK, Primary Examiner

U.S. Cl. X.R.

23—2, 255, 288

UNITED STATES PATENT OFFICE
CERTIFICATE OF CORRECTION

Patent No. 3,537,823  Dated November 3, 1970

Inventor(s) William B. Innes

It is certified that error appears in the above-identified patent and that said Letters Patent are hereby corrected as shown below:

Column 2, lines 58-59: Change "Preheated" to --preheater--.

Column 4, line 33: Change "available area" to --available surface area--.

Column 4, line 74: Change "smog constituents" to --smog forming constituents--.

Column 6, line 17: Change "flo wthrough" to --flow through--.

Table II, Example 5, Nature of Catalyst Column: Change "solution" to --solution$^a$--.

Table III, Title: Change "ofr" to --for--.

Column 9, line 29: Change "concentartion" to --concentration--.

Table IV, Note 1: Change "Bed temperature = 340 + 10°C." to --Bed temperature = 340 $\pm$ 10°C.--.

Table IX, Title: Change "Bde" to --Bed--.

Table IX, * note: Change "staurated" to --saturated--

SIGNED AND
SEALED
JAN 5 1971

(SEAL)
Attest:

Edward M. Fletcher, Jr,
Attesting Officer

WILLIAM E. SCHUYLER, JR,
Commissioner of Patents

UNITED STATES PATENT OFFICE
CERTIFICATE OF CORRECTION

Patent No. 3,537,823                    Dated November 3, 1970

Inventor(s) William B. Innes

It is certified that error appears in the above-identified patent and that said Letters Patent are hereby corrected as shown below:

Column 13, Table X, first column, line 3, "hexane"

should read -- hexene --.

Signed and sealed this 21st day of May 1974.

(SEAL)
Attest:

EDWARD M.FLETCHER,JR.            C. MARSHALL DANN
Attesting Officer                Commissioner of Patents